(12) United States Patent
Robertson

(10) Patent No.: US 10,160,627 B1
(45) Date of Patent: *Dec. 25, 2018

(54) VEHICLE DOOR LIFT

(71) Applicant: Larry Joseph Robertson, Burns, TN (US)

(72) Inventor: Larry Joseph Robertson, Burns, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/730,230

(22) Filed: Oct. 11, 2017

Related U.S. Application Data

(60) Provisional application No. 62/406,677, filed on Oct. 11, 2016.

(51) Int. Cl.
| | |
|---|---|
| *B66F 7/26* | (2006.01) |
| *B62B 3/10* | (2006.01) |
| *B62B 3/06* | (2006.01) |

(52) U.S. Cl.
CPC .............. *B66F 7/26* (2013.01); *B62B 3/0606* (2013.01); *B62B 3/0643* (2013.01); *B62B 3/108* (2013.01)

(58) Field of Classification Search
CPC ... B66C 23/48; B66F 9/12; B66F 9/18; B62B 3/0606
See application file for complete search history.

(56) References Cited

U.S. PATENT DOCUMENTS

| | | | | |
|---|---|---|---|---|
| 2,792,139 A | * | 5/1957 | Lloyd | ................... B60B 29/002 |
| | | | | 414/428 |
| 2,799,920 A | | 7/1957 | Hansen | |
| 3,858,864 A | | 1/1975 | Waldow | |
| 4,029,308 A | * | 6/1977 | Mathers | .................... B66C 1/62 |
| | | | | 269/17 |
| 4,183,511 A | * | 1/1980 | Marek | .................... B66C 23/48 |
| | | | | 254/100 |
| 4,538,796 A | | 9/1985 | Steck | |
| 4,810,151 A | * | 3/1989 | Shern | .................... B62B 3/108 |
| | | | | 269/17 |
| 4,932,639 A | | 6/1990 | Fjellstrom | |
| 5,009,406 A | | 4/1991 | McDermott | |
| D325,505 S | | 4/1992 | Hernandez | |
| 5,135,205 A | * | 8/1992 | Bedard | ................ B25H 1/0007 |
| | | | | 254/100 |
| 5,269,501 A | | 12/1993 | Liegel | |
| 5,915,742 A | | 6/1999 | Hung | |
| 6,024,348 A | | 2/2000 | Ventura | |
| 7,008,166 B1 | | 3/2006 | Grimes | |
| 7,243,904 B1 | | 7/2007 | Grimes | |
| 2007/0020075 A1 | | 1/2007 | Kelly | |

* cited by examiner

*Primary Examiner* — Jonathan Snelting
(74) *Attorney, Agent, or Firm* — Shane V. Cortesi

(57) ABSTRACT

A lift for a vehicle door is disclosed. The vehicle door lift may include a base that includes at least one wheel, a moveable frame connected to the base and comprising at least one moveable vertical post, a moveable bottom platform connected to the moveable frame and configured to hold the bottom of the door, and at least one hook located above the platform and connected to the moveable vertical post. The at least one hook may be configured to pivot relative to the post in order to be placed through a window opening of the vehicle door and wrap around a frame of the vehicle door forming the window opening. The moveable frame, platform and hook may be configured to move vertically upward relative to the vehicle door and the base by a user applying downward force on a lever connected to the frame.

15 Claims, 20 Drawing Sheets

VEHICLE DOOR LIFT

RELATED APPLICATIONS

The present application claims priority under 35 USC 119 to U.S. Provisional Application No. 62/406,677, filed Oct. 11, 2016 and entitled "Vehicle Door Lift", the contents of which are incorporated herein by reference in their entirety.

BACKGROUND

Technical Field

The present invention relates to apparatuses for assisting an operator in lifting a door of a vehicle.

Background of the Invention

Various models of the JEEP (Fiat Chrysler Automobiles, Detroit, Mich.) brand 4×4 vehicles include removable doors. Oftentimes, it is desirable for consumers to remove the doors in their garages and driveways. Yet, the doors are heavy, which creates problems for elderly, disabled and other individuals.

Various vehicle door apparatuses are described in the prior art, particularly with reference to holding doors in factories.

For example, U.S. Patent Publication No. 2007/0020075 describes a moveable platform designed for positioning under a door.

U.S. Pat. No. 7,243,904 describes a door lifting apparatus and method for use in a factory embodiment. The apparatus includes a frame and a lift mechanism. Among other disadvantages, U.S. Pat. No. 7,243,904 requires holders (labelled as 116) that extend through openings in the door.

U.S. Pat. Nos. 3,858,864 and 6,024,348 also disclose vehicle door supporting apparatuses for use in factories and body shops.

Thus, there is a need for new vehicle door lifting apparatuses, particularly those that are designed ergonomically for use by vehicle owners.

BRIEF SUMMARY

The present disclosure provides vehicle door lifts as described herein.

In some embodiment, the present disclosure provides a vehicle door lift system comprising: a) a base comprising at least one wheel configured to move along the ground; b) a lever configured to be moved by a human user; c) a moveable frame comprising at least one moveable vertical post located above and extending generally vertically upwardly relative to the base, the moveable frame configured to move vertically relative to the base, the moveable frame connected to the lever and configured be moved by the lever; d) at least one moveable bottom platform extending laterally from the at least one moveable vertical post and located above the base, the at least one moveable bottom platform configured to be placed under and support the bottom of a vehicle door comprising a vehicle door window frame defining a window opening, the at least one moveable bottom platform configured to be moved by the at least one moveable vertical post vertically relative to the base; and e) at least one moveable hook connected to the at least one moveable vertical post, the at least one moveable hook located above the base and above the at least one moveable bottom platform, the at least one moveable hook configured to be moved by the at least one moveable vertical post vertically relative to the base, the at least one moveable hook configured to rotate relative to the at least one post from a storage position to a door grasp position in which the at least one moveable hook wraps around a portion of the vehicle door window frame.

Optionally, exerting downward force on the lever is configured to move the at least one moveable vertical post vertically relative to the base. Optionally, the moveable frame is configured to move vertically relative to the base along a track extending generally vertically upwardly from the base. Optionally, the track comprises at least one fixed vertical post extending vertically upwardly from the base and generally parallel to the at least one moveable vertical post, further wherein the at least one moveable vertical post comprises an interior and further wherein the at least one fixed vertical post is nested in the interior of the at least one moveable vertical post. Optionally, the track comprises at least one fixed vertical post extending vertically upwardly from the base and generally parallel to the at least one moveable vertical post, further wherein the at least one fixed vertical post comprises an interior and further wherein the at least one moveable vertical post is nested in the interior of the at least one fixed vertical post. Optionally, the system further comprises a fixed stand extending generally vertically relative to the base and generally parallel to the at least one moveable vertical post, the fixed stand comprising a fixed stand height, wherein the lever comprises a rear portion comprising a handle bar, a middle portion comprising a middle bar pivotably attached to the fixed stand and extending generally perpendicular relative to the fixed stand height, and a forward portion comprising a lifter bar extending transversely relative to the at least one moveable vertical post and attached to the at least one moveable vertical post. Optionally, the lever comprises a length extending from the forward portion to the rear portion, wherein the handle bar comprising a length generally parallel to the lever length, wherein the lifter bar comprises a length generally parallel to the lever length, and further wherein the length of the lifter bar is less than the length of the handle bar length. Optionally, the handle bar is partially nested in an interior of a female cup, wherein the middle bar comprises a middle bar first aperture adjacent to a first side of the stand and the female cup comprises a female cup aperture aligned with the middle bar first aperture, and the system comprises a removable pin extending through the middle bar first aperture and the female cup aperture and connecting the female cup to the middle bar. Optionally, the middle bar comprises a second aperture adjacent to a second side of the stand and the female cup aperture is configured to be moved so that it aligns with the second aperture. A removable pin may be placed through the second aperture and the female cup aperture so that the female cup aperture is adjacent to the second side of the stand. Optionally, the at least one moveable hook is configured to rotate between about 90 degrees and about 180 degrees about a hook pin from the storage position to the door grasp position. Optionally, the at least one moveable vertical post comprises padding. Optionally, the base comprises at least two wheels sharing a common axle. Optionally, the base comprises at least one caster wheel. Optionally, the system comprises at least one pin configured to allow the height of the moveable bottom platform relative to the base and/or at least one hook to be adjustable.

In still further embodiments, the present disclosure provides a vehicle door lift system comprising:

a) a base comprising at least two wheels configured to move along the ground;

b) a lever configured to be moved by a human user;

c) at least one moveable vertical post located above and extending generally vertically relative to the base;

d) at least one moveable bottom platform extending laterally from the at least one moveable vertical post and generally parallel to the ground and located above the base, the at least one moveable bottom platform configured to be placed under and support the bottom of a vehicle door comprising a vehicle door window frame defining a window opening;

e) at least one moveable hook connected to a top of the at least one moveable vertical post, the at least one moveable hook located above the base and above the at least one moveable bottom platform, the at least one moveable hook configured to rotate relative to the at least one post from a storage position to a door grasp position in which the at least one moveable hook wraps around a portion of the vehicle door window frame; and f) at least one fixed vertical post extending vertically upwardly from the base and generally parallel to the at least one moveable vertical post, wherein downward movement of the lever is configured to cause the at least one moveable vertical post to move upwardly along the at least one fixed vertical post and to cause the at least one moveable vertical post, the at least one moveable hook and the at least one moveable bottom platform to move as a single unit vertically upwardly relative to the base and the ground and further wherein upward movement of the lever is configured to cause the at least one moveable vertical post to move downwardly along the at least one fixed vertical post and to cause the at least one moveable vertical post, the at least one moveable hook and the at least one moveable bottom platform to move as a single unit vertically downwardly relative to the base and the ground (i.e., back to the start position).

The system may include one or more features of the prior embodiment, including without limitation the fixed stand, the lever components, the pin, the caster wheel, the padding, the rotation of the at least one moveable hook, and the female cup. In addition, the systems may be used in a method that includes a) providing the vehicle door lift system; b) placing the at least one moveable bottom platform under a vehicle door attached to a vehicle; c) moving the lever so as to move the vehicle door, the at least one moveable bottom platform, the at least one moveable hook and the least one moveable vertical post upwardly relative to the ground; and disengaging the vehicle door from the vehicle.

BRIEF DESCRIPTION OF THE DRAWINGS

in FIG. 1, the vehicle door lift system is in the stowed position.

in FIG. 2A, the vehicle door lift system is in the resting empty position.

in FIG. 2B, the vehicle door lift system is in the resting empty position and the removable pin has been removed to show the middle bar first aperture and female cup aperture.

in FIG. 2C, the vehicle door lift system is in the resting empty position and the removable pin and another cotter pin have been removed to show the middle bar first aperture and female cup aperture.

in FIG. 3, the vehicle door lift system is in the door engaged position.

in FIG. 4, the vehicle door lift system is in the door captured position.

in FIG. 5, the vehicle door lift system is in the door lift position.

in FIG. 6, the vehicle door lift system is in the door removed position.

in FIG. 7, the vehicle door lift system is in the door lift position.

in FIG. 8, the vehicle door lift system is in the door captured position.

in FIG. 11, the vehicle door lift system is in the door lift position.

in FIG. 12, the vehicle door lift system is in the door lift position.

in FIG. 13, the vehicle door lift system is in the door lift position.

in FIG. 14, the vehicle door lift system is in the door lift position.

in FIG. 15, the vehicle door lift system is in the door lift position.

in FIG. 16, the vehicle door lift system is in the door captured position.

in FIG. 17, the vehicle door lift system is in the door lift position.

in FIG. 18, the vehicle door lift is in the door captured position.

in FIG. 19, the vehicle door lift is in the door lift position.

DETAILED DESCRIPTION

Figure 1:
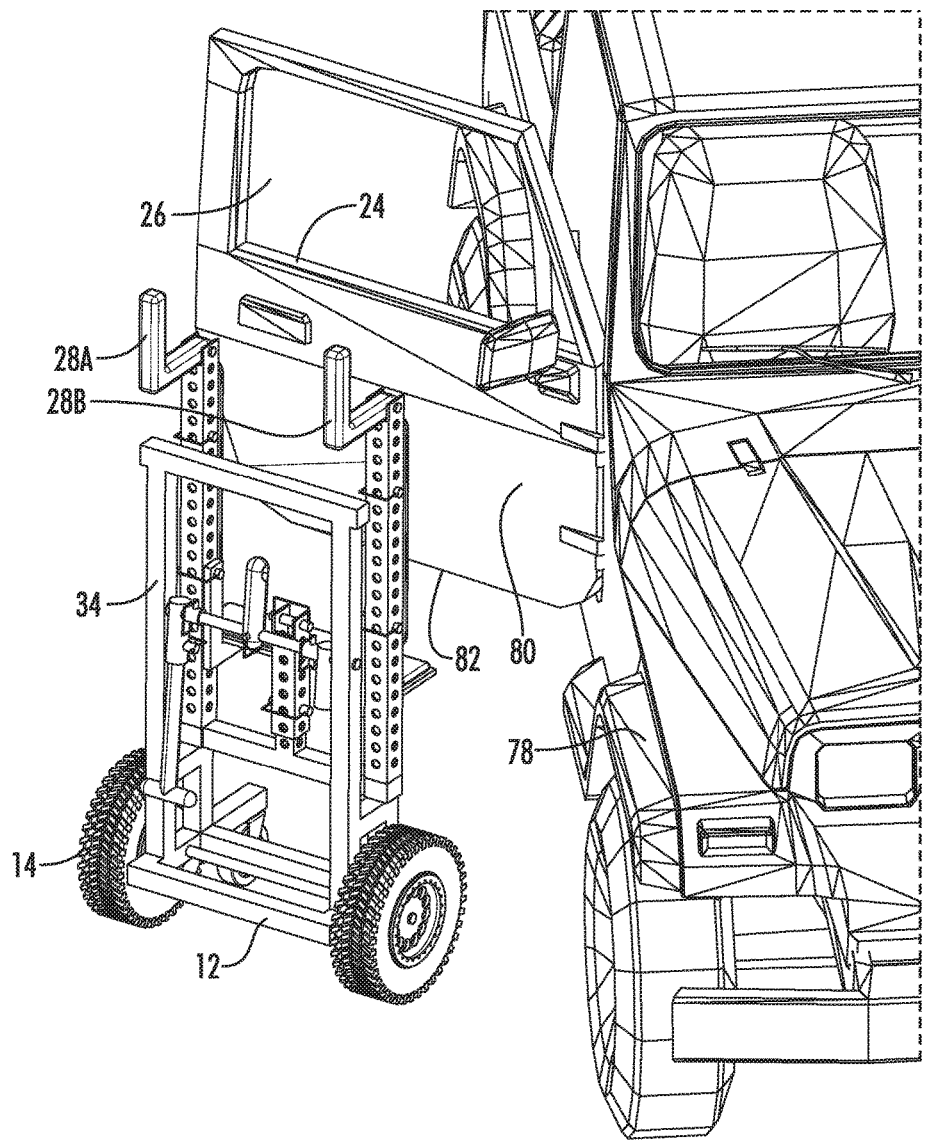
FIG. 1 illustrates a front perspective view of a vehicle door lift system next to a vehicle.
Figure 2A:
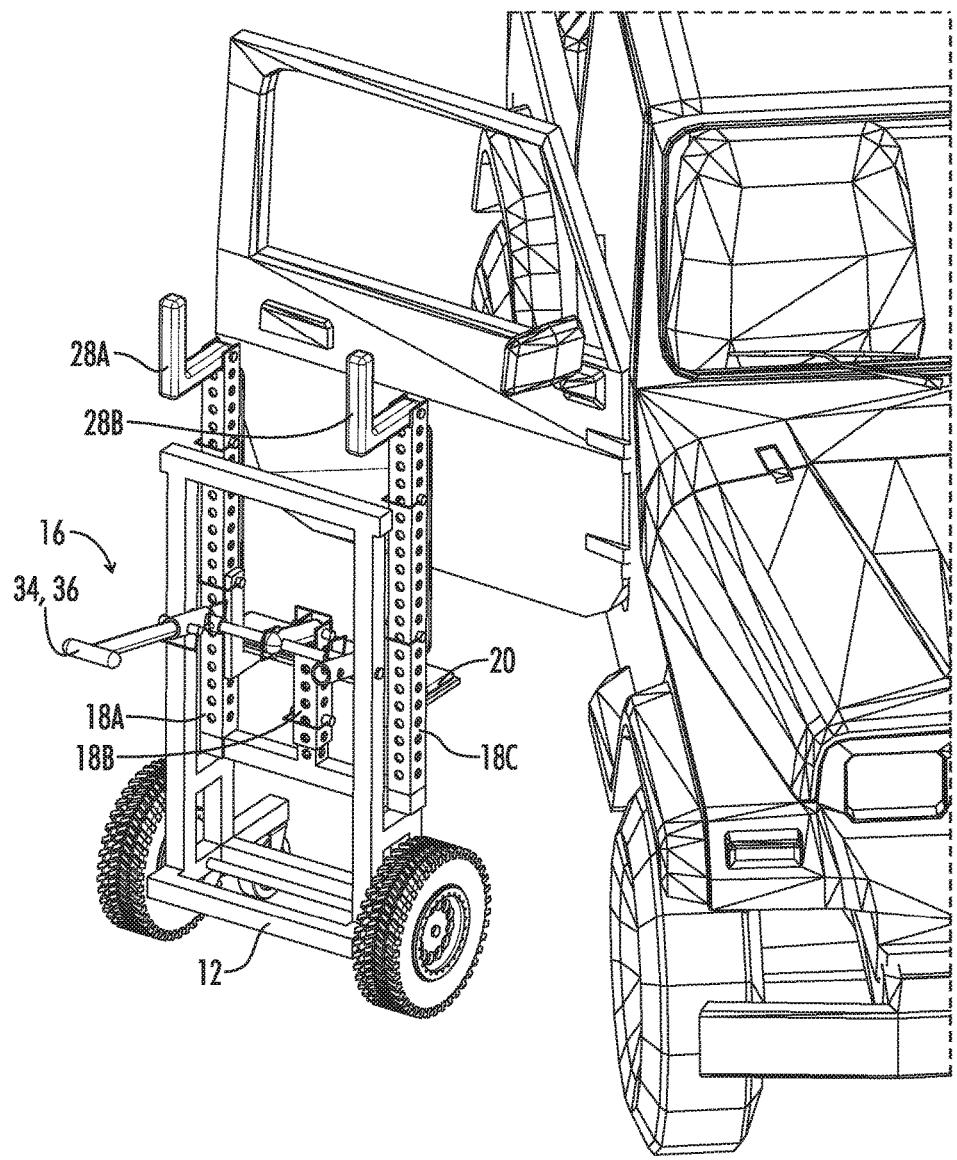
FIG. 2A illustrates a front perspective view of the vehicle door lift system of FIG. 1.
Figure 2B:
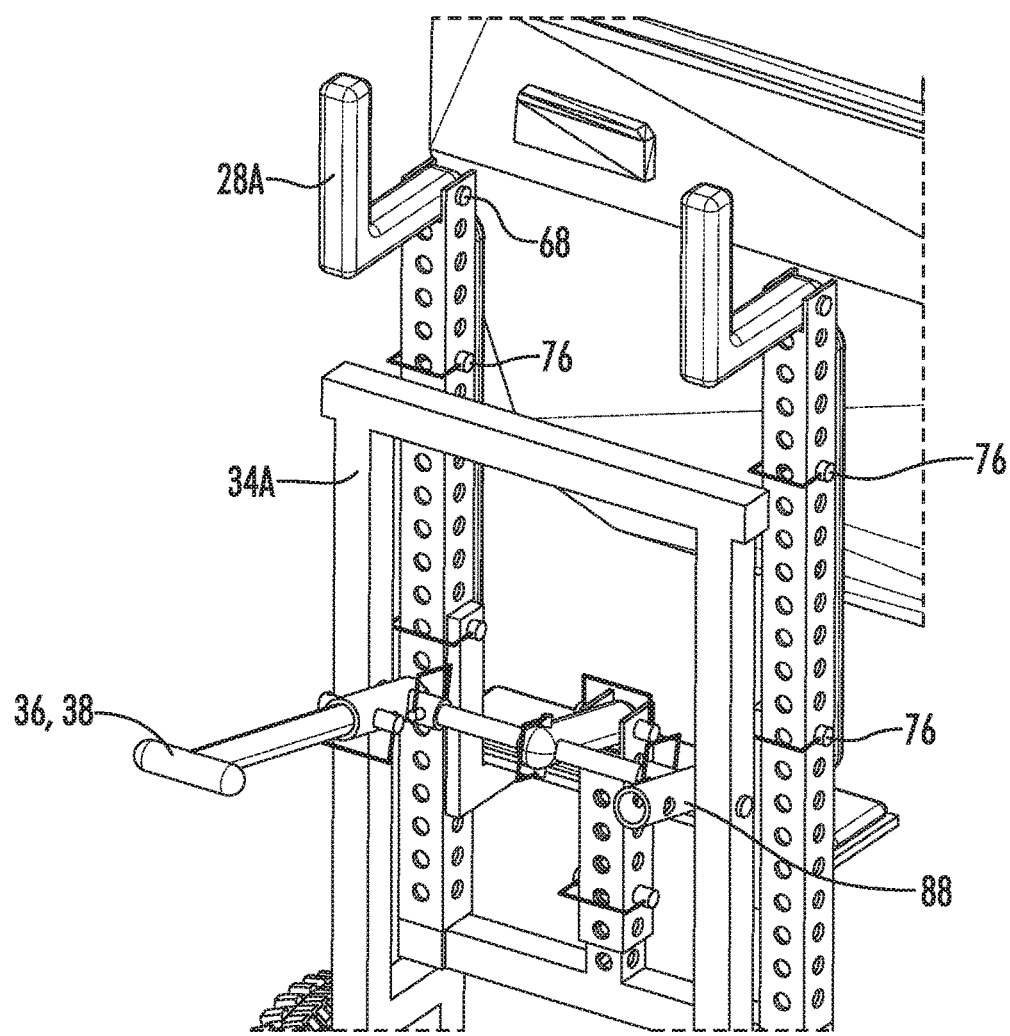
FIG. 2B illustrates a front perspective view of the vehicle door lift system of FIG. 1.
Figure 2C:
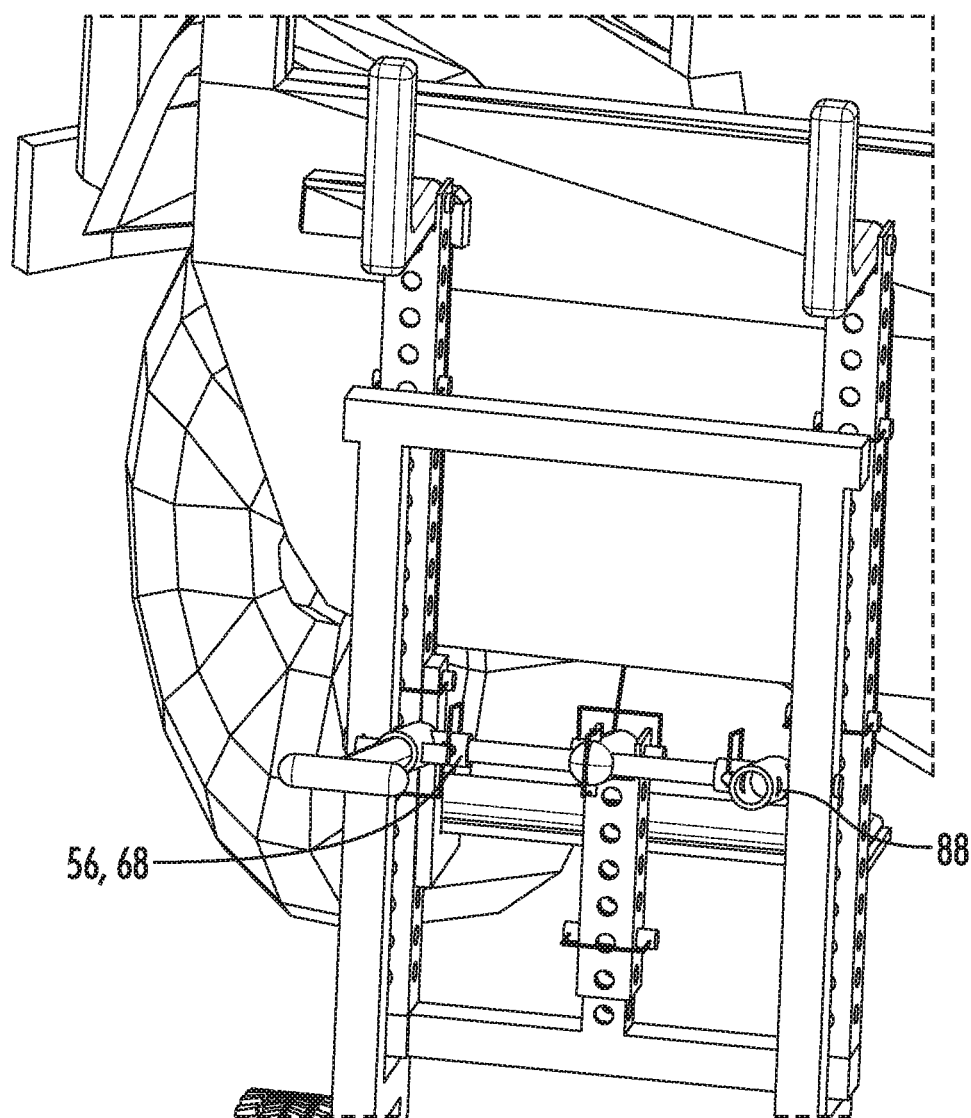
FIG. 2C illustrates a front perspective view of the vehicle door lift system of FIG. 1.

With reference to FIGS. 1-19 the present invention provides a vehicle door lift system, designated by the numeral 10. In the drawings, not all reference numbers are included in each drawing for the sake of clarity.

FIGS. 1-19 show the vehicle door lift system 10 in a variety of positions, including a stowed position in which the lever 16 is not engaged with the at least one moveable vertical post 18A, 18B and 18C; a resting empty position in which the lever 16 is engaged with the at least one moveable vertical post 18A, 18B and 18C and the at least one moveable bottom platform 20 does not support a vehicle door 80; a door engaged position in which i) the lever 16 is engaged with the at least one moveable vertical post 18A, 18B and 18C and the at least one moveable bottom platform 20 supports a vehicle door 80 and is located at first height off the ground and ii) in which the at least one moveable hook 28A and 28B is/are in a storage position; a door captured position that is similar to the door engaged position except that the at least one moveable hook 28A and 28B is/are in a door grasp position; a door lift position in which the at least one moveable platform 20 and at least one moveable hook 28A and 28B are located at a raised height relative to the door engaged position; and a door removed position in which the vehicle door lift system 10 has removed the vehicle door 80 from the vehicle 78.

Referring further to FIGS. 1-19, in some embodiments, the vehicle door lift system 10 includes a base 12 comprising at least one wheel 14 configured to move along the ground. The base 12 may include, for example, two wheels 14 that share a common axle 72 as well as one or more caster wheels 74.

The vehicle door lift system 10 may also include a lever 16 configured to be moved by a human user and a moveable frame 84 comprising at least one moveable vertical post 18A, 18B, and 18C located above and extending generally vertically upwardly relative to the base 12, the moveable frame 84 configured to move vertically upwardly relative to the base 12, the moveable frame 84 connected to the lever 16 and configured be moved by the lever 16. For example, in the illustrated embodiments, the moveable frame 84 includes three vertical posts 18A, 18B, and 18C connected by a lower horizontal bar 90.

The vehicle door lift system 10 may further include at least one moveable bottom platform 20 connected to the moveable frame 84, extending laterally relative to the at least one moveable vertical post 18A, 18B, and 18C (and generally parallel to the ground) and located above the base 12. The at least one moveable bottom platform 20 may be in the form of an arm or a shelf and is configured to be placed under and support the bottom 82 of a vehicle door 80. The vehicle door 80 preferably includes a window frame 24 defining a window opening 26, and the at least one moveable bottom platform 20 is configured to be moved by the moveable frame 84 vertically relative to the base 12.

The vehicle door lift system 10 may further include at least one moveable hook 28A and 28B connected to the moveable frame 84. The at least one moveable hook 28A and 28B is located above the base 12 and above the at least one moveable bottom platform 20. Preferably, the system 10 includes a left moveable hook 28A connected to the top of the left moveable vertical post 20A and a right moveable hook 28B connected to the top of the right moveable vertical post 18C. The at least one moveable hook 28A and 28B is configured to be moved by the moveable frame 84 vertically upwardly relative to the base 12. In other words, the moveable vertical posts 18A, 18B and 18C may be configured to move upwardly along with the moveable hook 28A and 28B and the moveable bottom platform 20 as a single unit. The vertical post 18A, 18B, and 18C and hook 28A and 28B are said to be moveable because they move vertically along with the moveable frame 84 both upwardly and, preferably, downwardly to the start position. In addition, the vertical post(s) 18A, 18B, and 18C is said to be vertical because preferably the vertical post 18A, 18B, and 18C is generally perpendicular to the ground.

The at least one moveable hook 28A and 28B may also be configured to rotate relative to the at least one moveable vertical post 18A, 18B, and 18C from a storage position to a door grasp position in which the at least one moveable hook 28A and 28B wraps around a portion of the vehicle door 80 (preferably the window frame 24).

Optionally, the vehicle door lift system 10 is used by a method that includes placing the moveable bottom platform 20 under the bottom 82 of the vehicle door 80 so that the vehicle door lift system 10 is in the door engaged position and then exerting downward force on the lever 16 (using the user's hand) so as to move the at least one moveable frame 84 as well as the moveable bottom platform 20, moveable hook(s) 28A and 28B and vehicle door 80 vertically upwardly relative to the base 12 so that the vehicle door lift system 10 is in the door lift position. At that point, the user can then detach the door 80 from vehicle 12 by removing door hinges. Preferably, the system 10 is manually/hand-operated.

Figures 12, 12A:
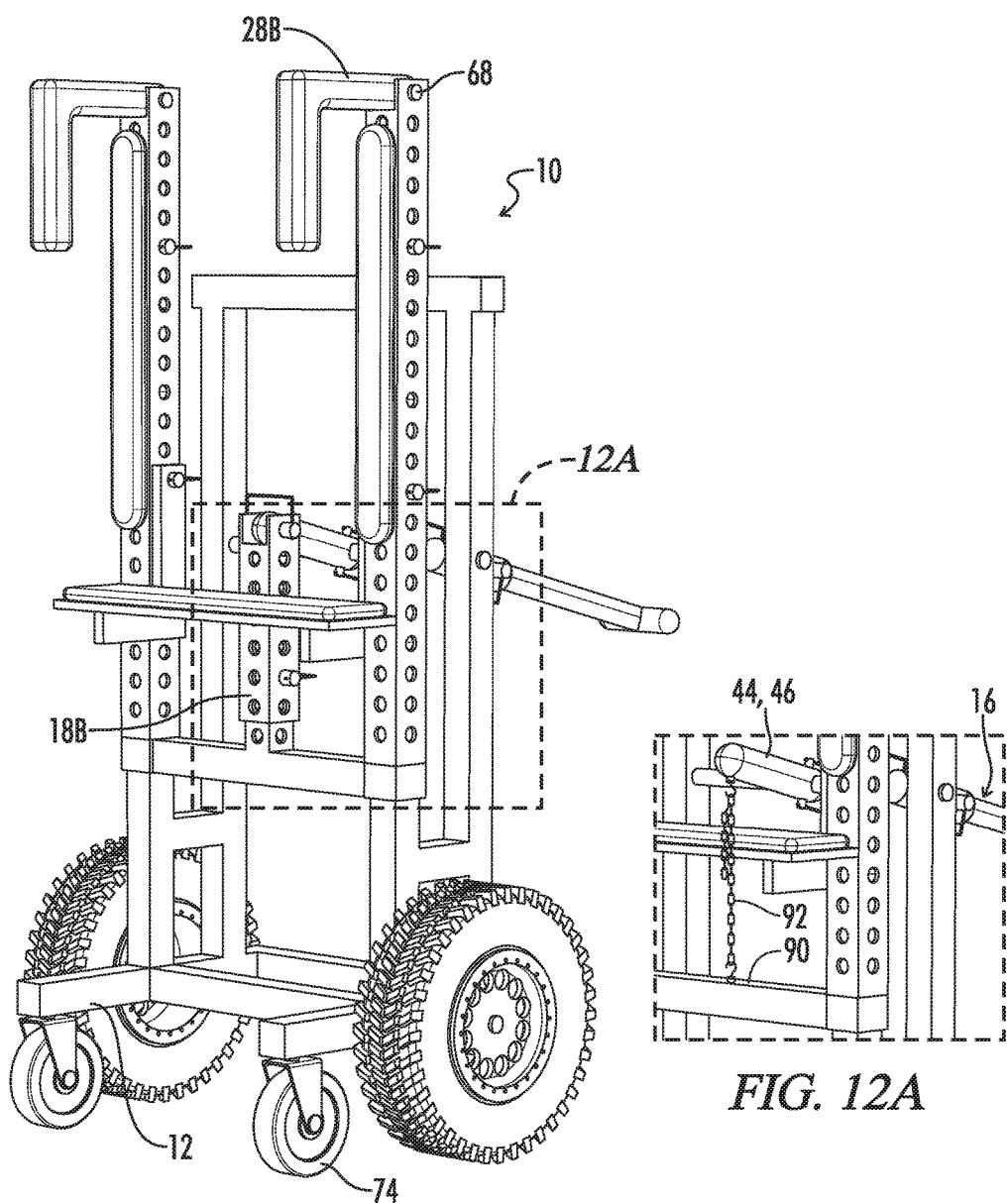
FIG. 12 illustrates another rear perspective view of the vehicle door lift system of FIG. 1.
FIG. 12A illustrates a rear perspective view the portion of the rectangular area labelled 12A in FIG. 12 with a chain used instead of the middle vertical post.
Figure 13:
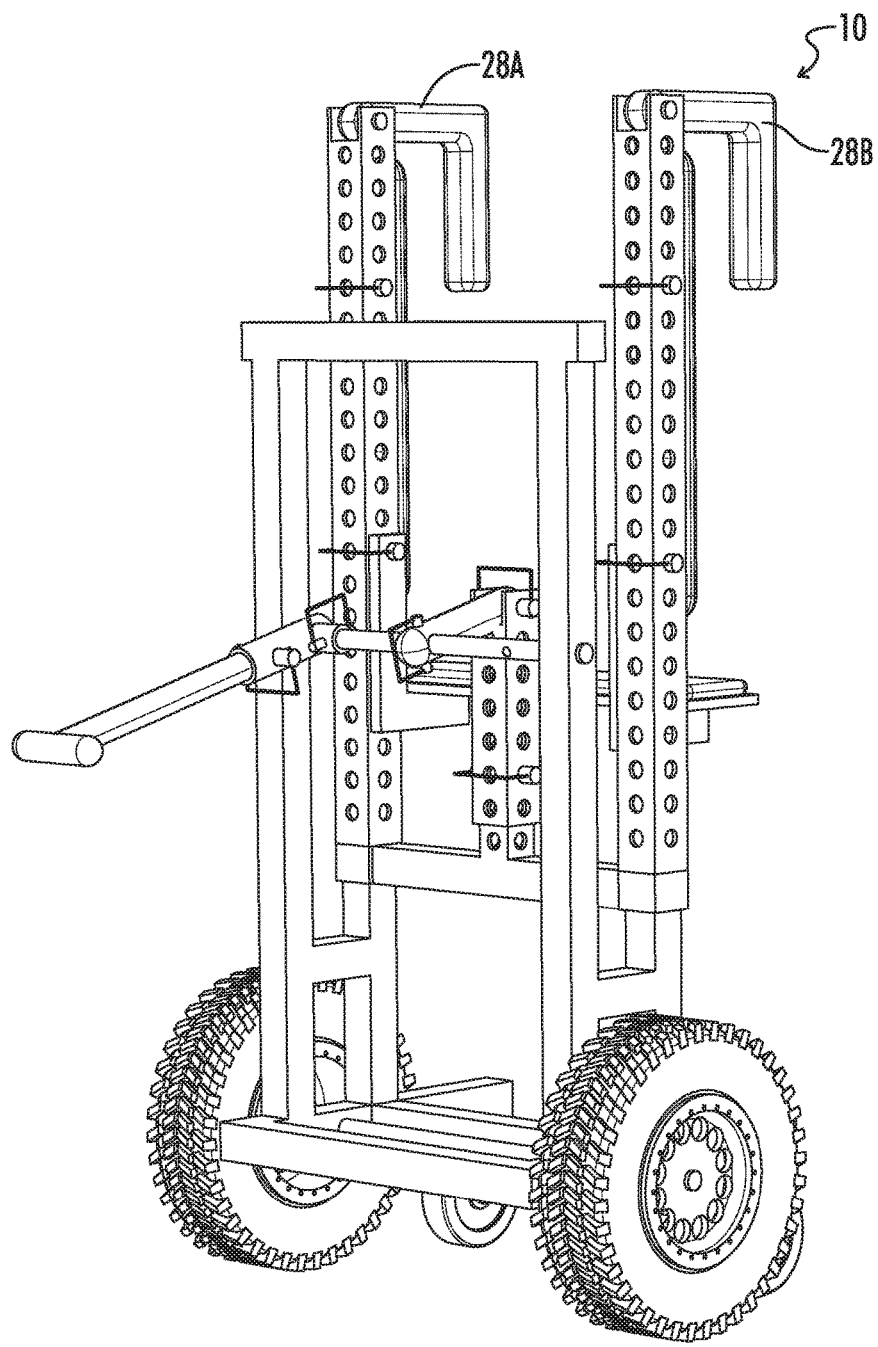
FIG. 13 illustrates a front perspective view of the vehicle door lift system of FIG. 1.
Figure 14:
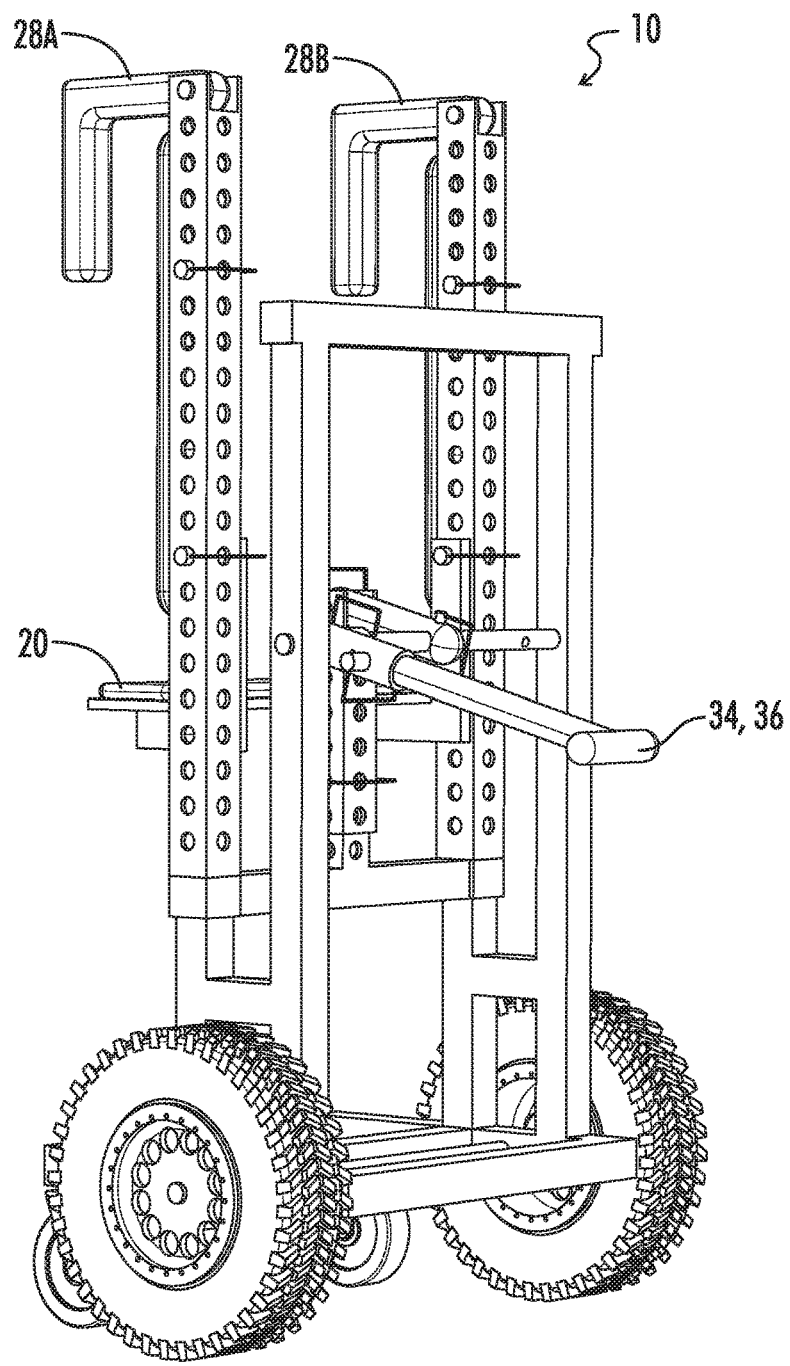
FIG. 14 illustrates another front perspective view of the vehicle door lift system of FIG. 1.
Figure 15:
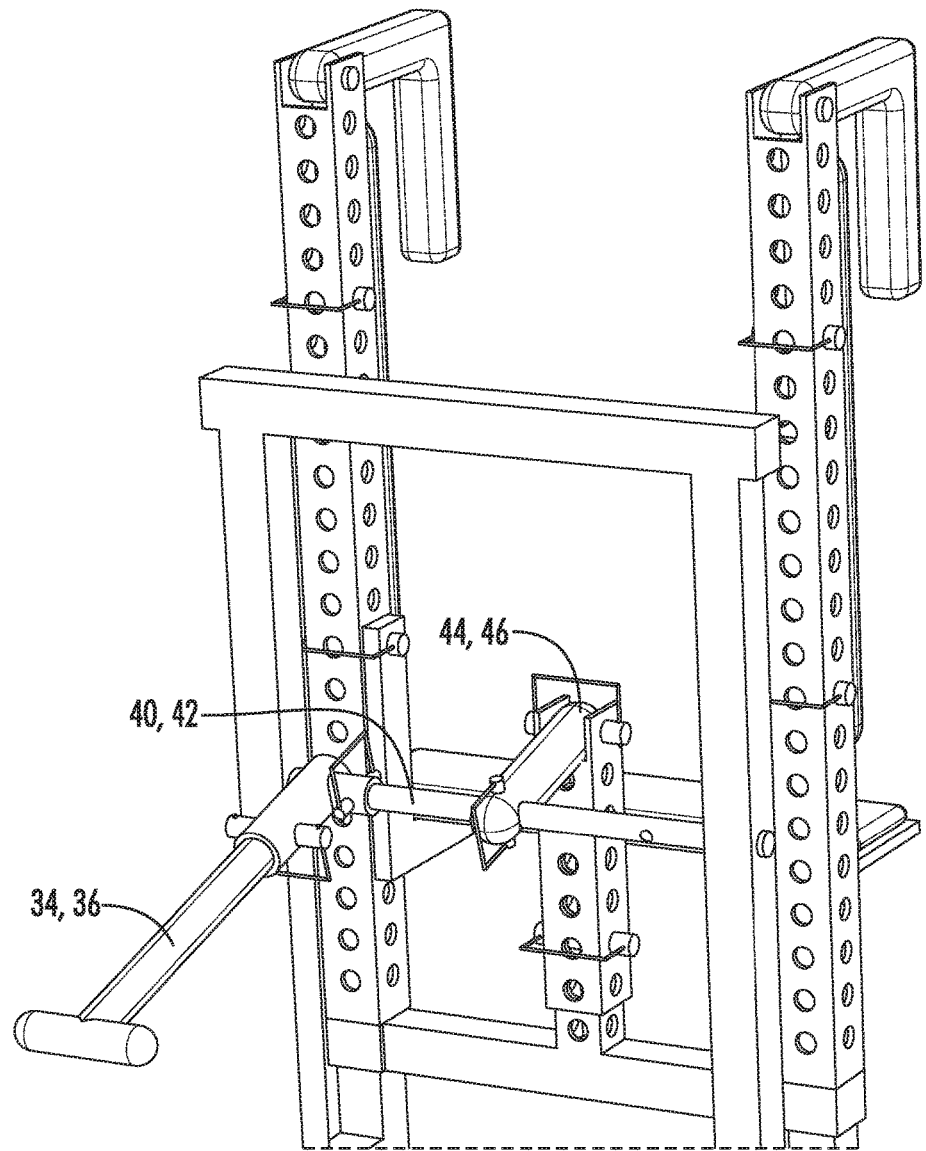
FIG. 15 illustrates a closeup front perspective view of the vehicle door lift system of FIG. 1.
Figure 16:
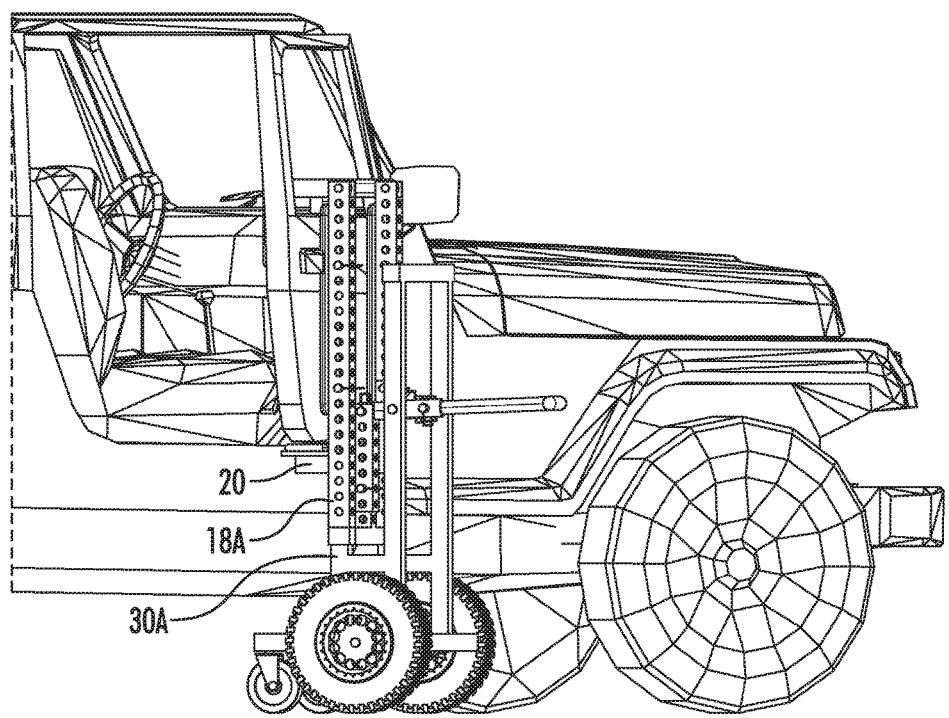
FIG. 16 illustrates a side perspective view of the vehicle door lift system of FIG. 1.
Figure 17:
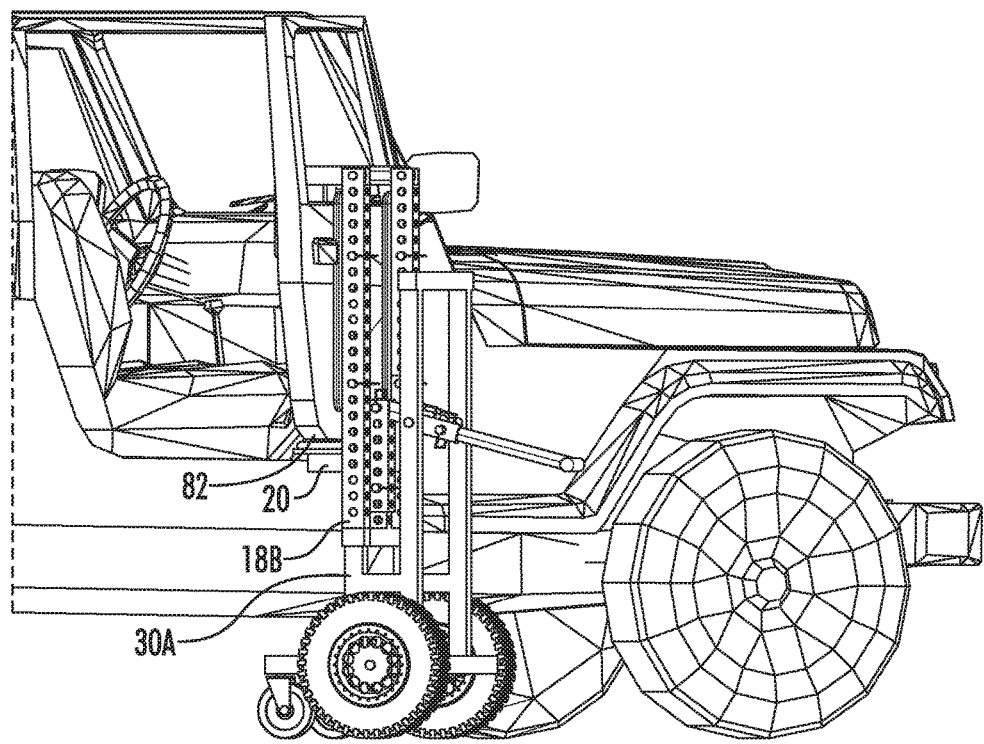
FIG. 17 illustrates a side perspective view of the vehicle door lift system of FIG. 1.
Figure 18:
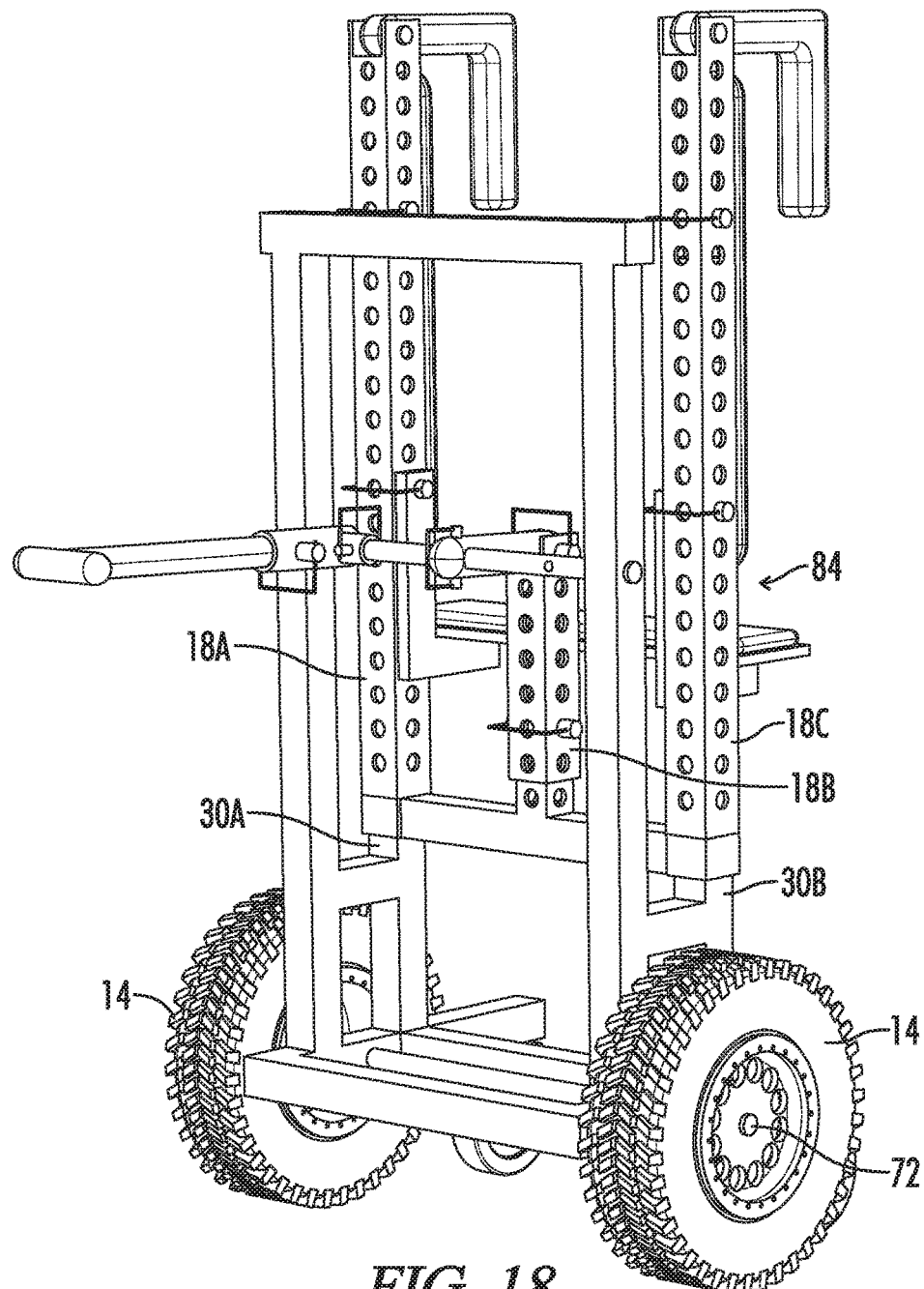
FIG. 18 illustrates a closeup front perspective view of the vehicle door lift system of FIG. 1.
Figure 19:
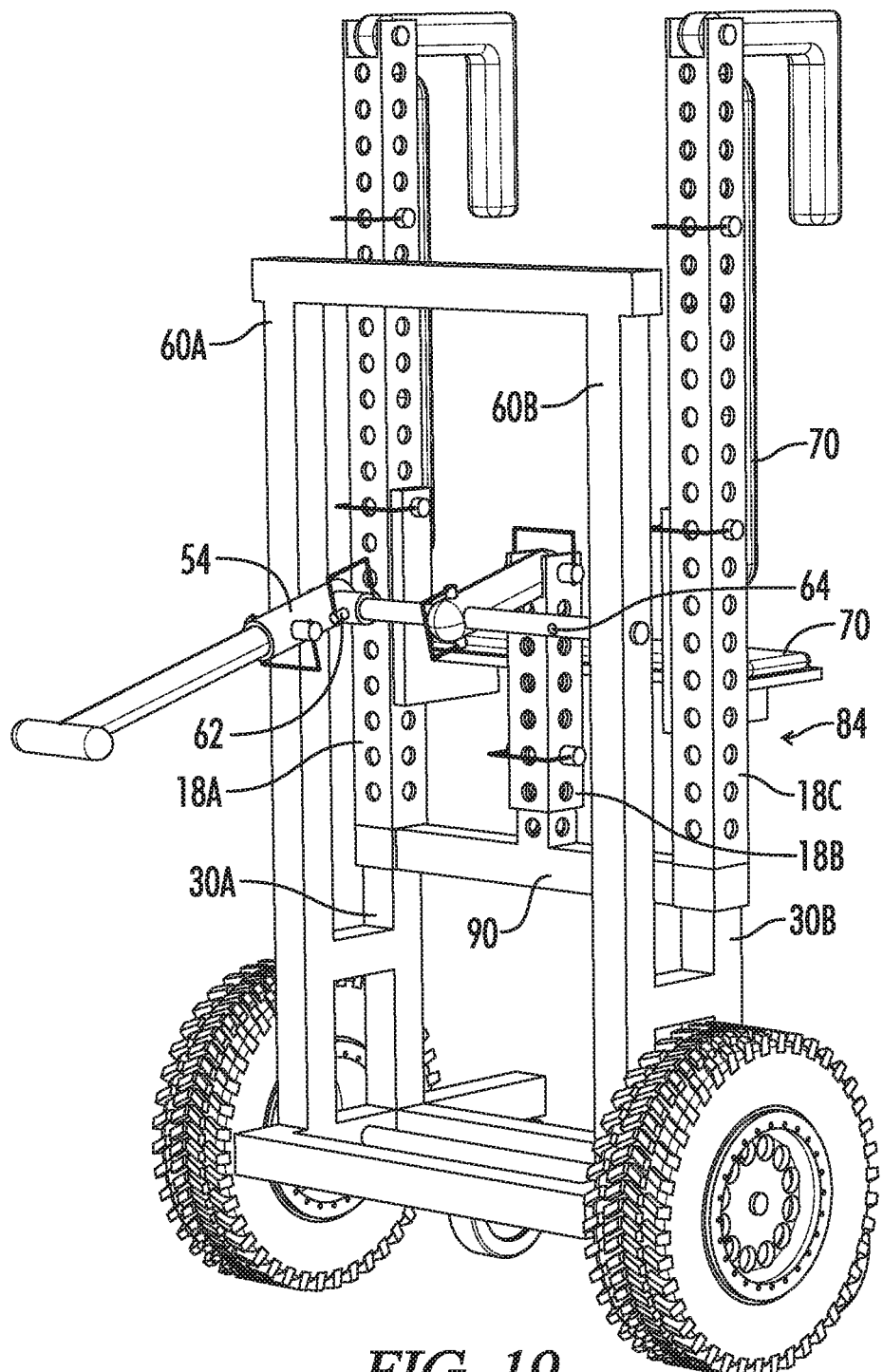
FIG. 19 illustrates a closeup front perspective view of the vehicle door lift system of FIG. 1.

Optionally, the moveable frame 84 is configured to move vertically relative to the base 12 along a track extending generally vertically upwardly from the base 12. More particularly, the track may be comprised of at least one fixed vertical post 30A and 30B extending vertically upwardly from the base 12 and generally parallel to the at least one moveable vertical post 18A, 18B and 18C to disengage the vehicle door hinge from the vehicle 80. For example, in the illustrated embodiment, as best seen by comparing FIG. 18 (door captured position) and FIG. 19 (door lift position), the moveable frame 84 may be configured to move at least a few inches vertically upward by pushing downwardly on the lever 16. Optionally, each of the at least one moveable vertical post 18A, 18B and 18C comprises an interior and each of the at least one fixed vertical post 30A and 30B is nested in the interior of a moveable vertical post 18A, 18B and 18C, as best seen in FIG. 18. Alternatively, each of the at least one moveable vertical post 18A, 18B and 18C may be nested in the interior of at least one fixed vertical post 30A and 30B. Optionally, instead of a middle vertical post 18B, a chain 92 may be used as shown in FIG. 12 to connect lever 16 to lower horizontal bar 90.

Optionally, the vehicle door lift system 10 comprises a fixed stand 34 extending generally vertically relative to the base 12 and generally parallel to the at least one moveable vertical post 18A, 18B and 18C and the fixed vertical posts 30A and 30B. The fixed stand 34 may have a fixed stand height 86. Optionally, the lever 16 comprises a rear portion 36 comprising a handle bar 38, a middle portion 40 comprising a middle bar 42 pivotably/rotatable attached to the fixed stand 34 and extending generally perpendicular relative to the fixed stand height 86 (and parallel to the ground), and a forward portion 44 comprising a lifter bar 46 extending transversely relative to the at least one moveable vertical post 18A, 18B, and 18C and attached to the at least one moveable vertical post 18A, 18B, and 18C (more particularly middle vertical post 18B in the illustrated embodiment). Optionally, the lever 16 comprises a length 48 extending from the forward portion 44 to the rear portion 36, the handle bar 38 comprising a length 52 generally parallel to the lever length 48, the lifter bar 46 comprises a length 50 generally parallel to the lever length 48, and the length 50 of the lifter bar 46 is less than the length 52 of the handle bar 38 (e.g., at least 3 times less), which is designed to increase the mechanical advantage of the lever 16. Optionally, the middle bar 42 is the fulcrum of the lever 16.

Optionally, the handle bar 38 is partially nested in an interior of a female cup 54, the middle bar 42 comprises a middle bar first aperture 58 adjacent to a first side 60A (e.g., left side) of the fixed stand 34 and the female cup 54 comprises a female cup aperture 56 aligned with the middle bar first aperture 58. Optionally, the system 10 comprises a removable pin 62 extending through the middle bar first aperture 58 and the female cup aperture 56 so as to connect the female cup 54 to the middle bar 42. The purpose of this attachment is to allow the handle bar 38 to be located on the left 60A or right side 60B of the fixed stand 34 depending on whether the user is left or right handed. Thus, the middle bar 42 may comprise a second aperture 64 adjacent to a second side 60B (e.g., right side) of the fixed stand 34 and the female cup aperture 56 may be configured to be moved so that it aligns with the second aperture 64. A removable pin 62 may then be placed through the second aperture 64 and the female cup aperture 56 and so that the female cup aperture 56 is adjacent to the second side 60B of the stand 34. The resting empty and stowed positions of FIGS. 1 2A, 2B and 2C, show a second female cup 88 in order to visualize how the handle bar 38 can be moved from the left side 60A to the right side 60B of the stand 34.

Figure 3:
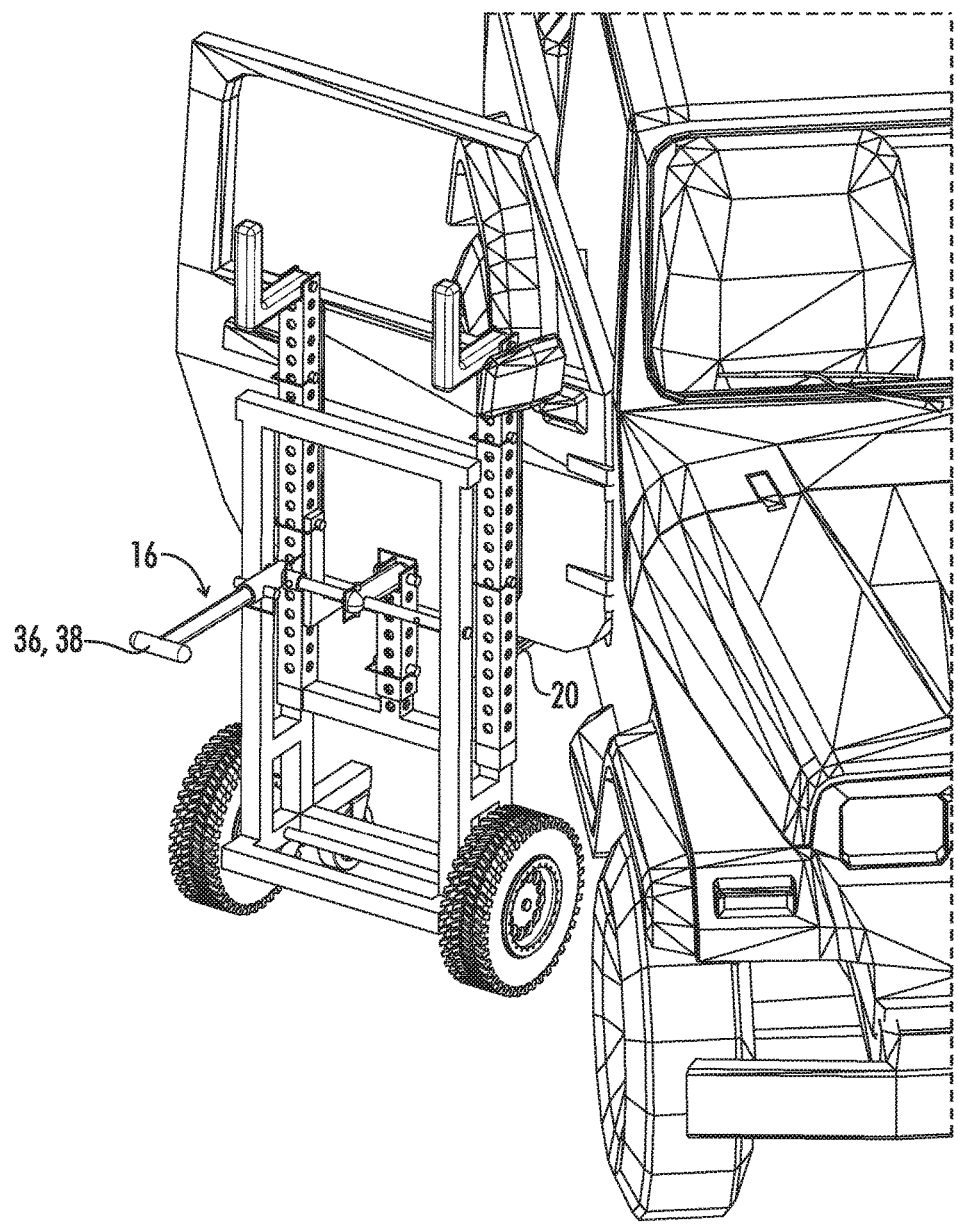
FIG. 3 illustrates a front perspective view of the vehicle door lift system of FIG. 1.
Figure 4:
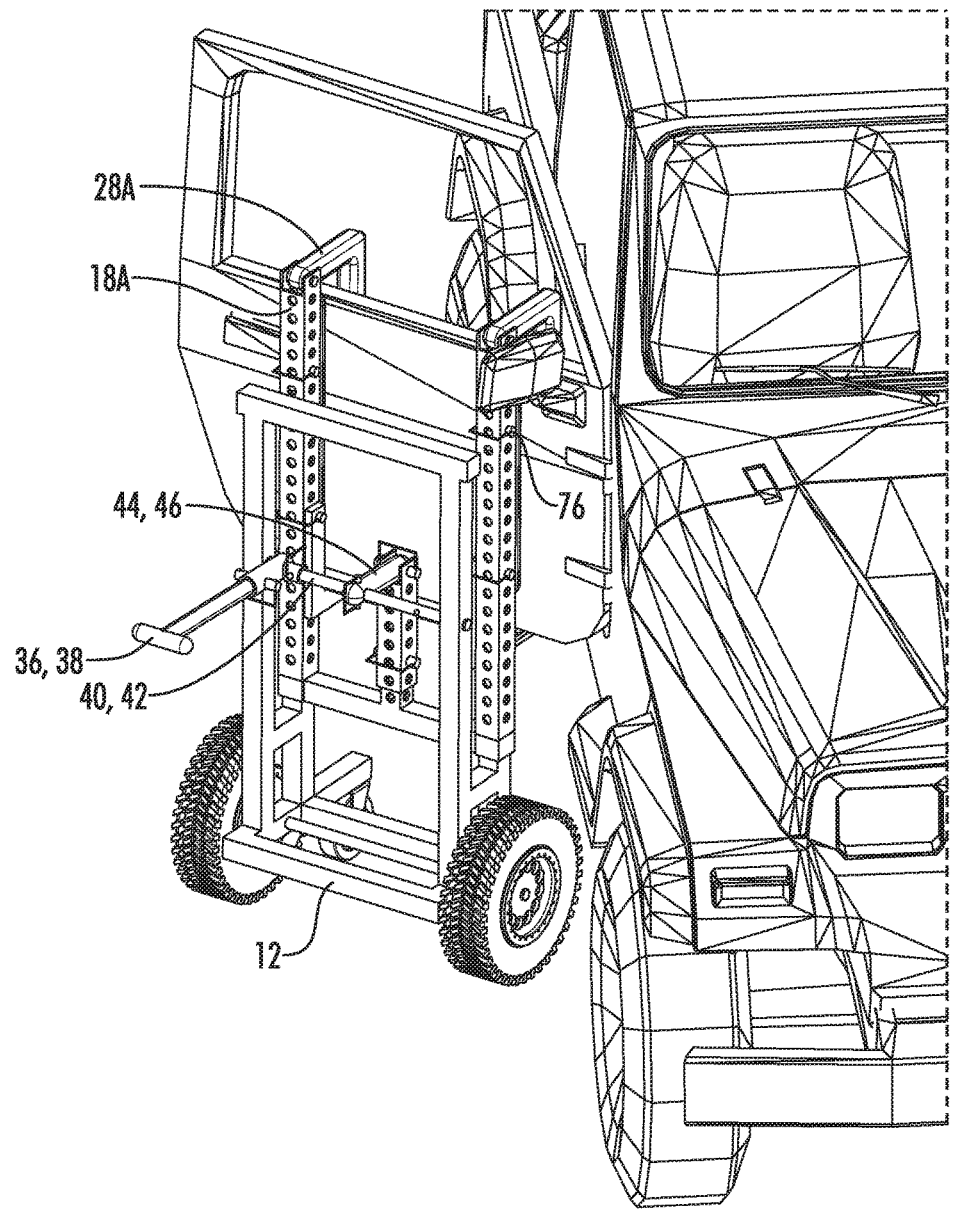
FIG. 4 illustrates a front perspective view of the vehicle door lift system of FIG. 1.
Figure 5:
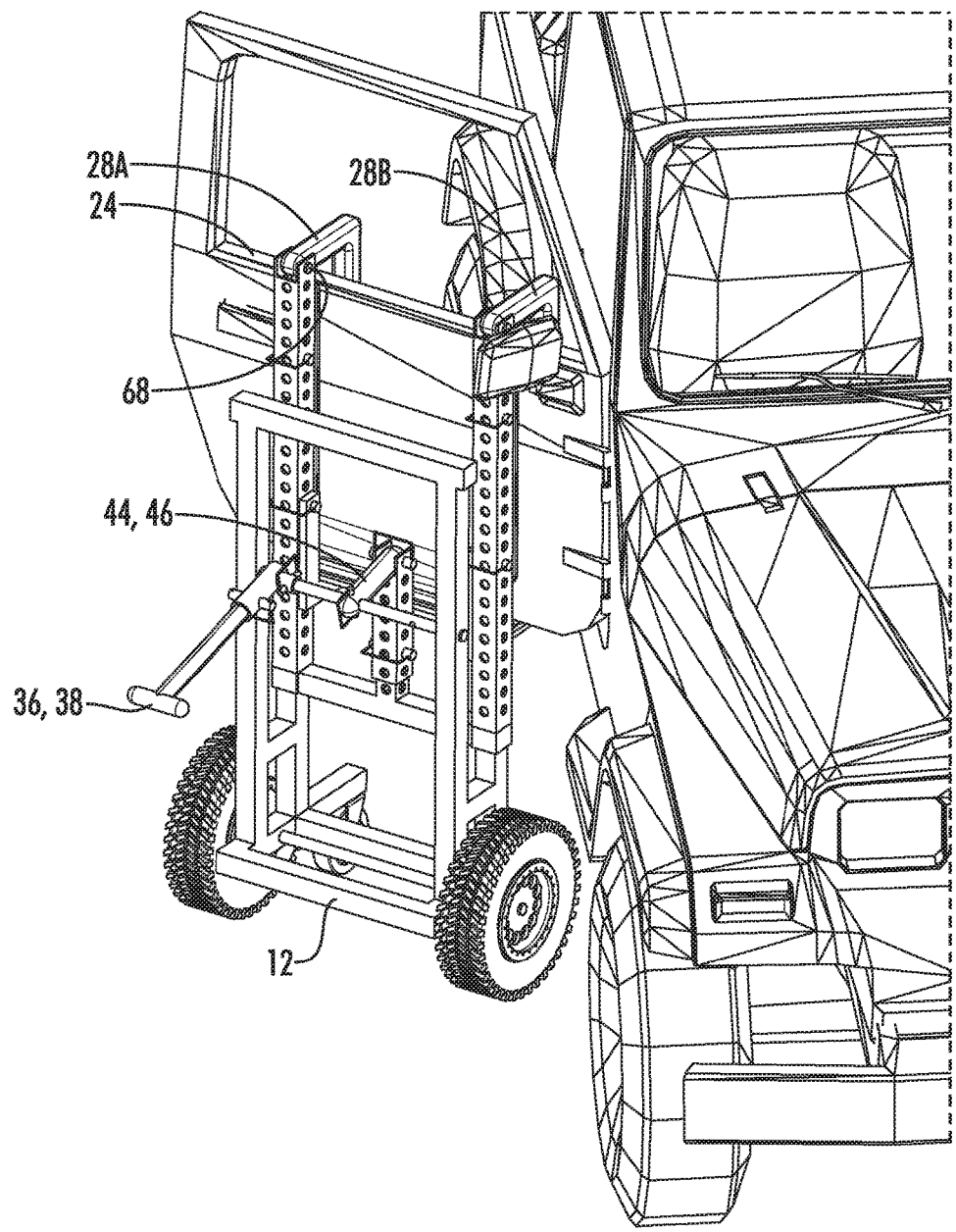
FIG. 5 illustrates a front perspective view of the vehicle door lift system of FIG. 1.
Figure 6:
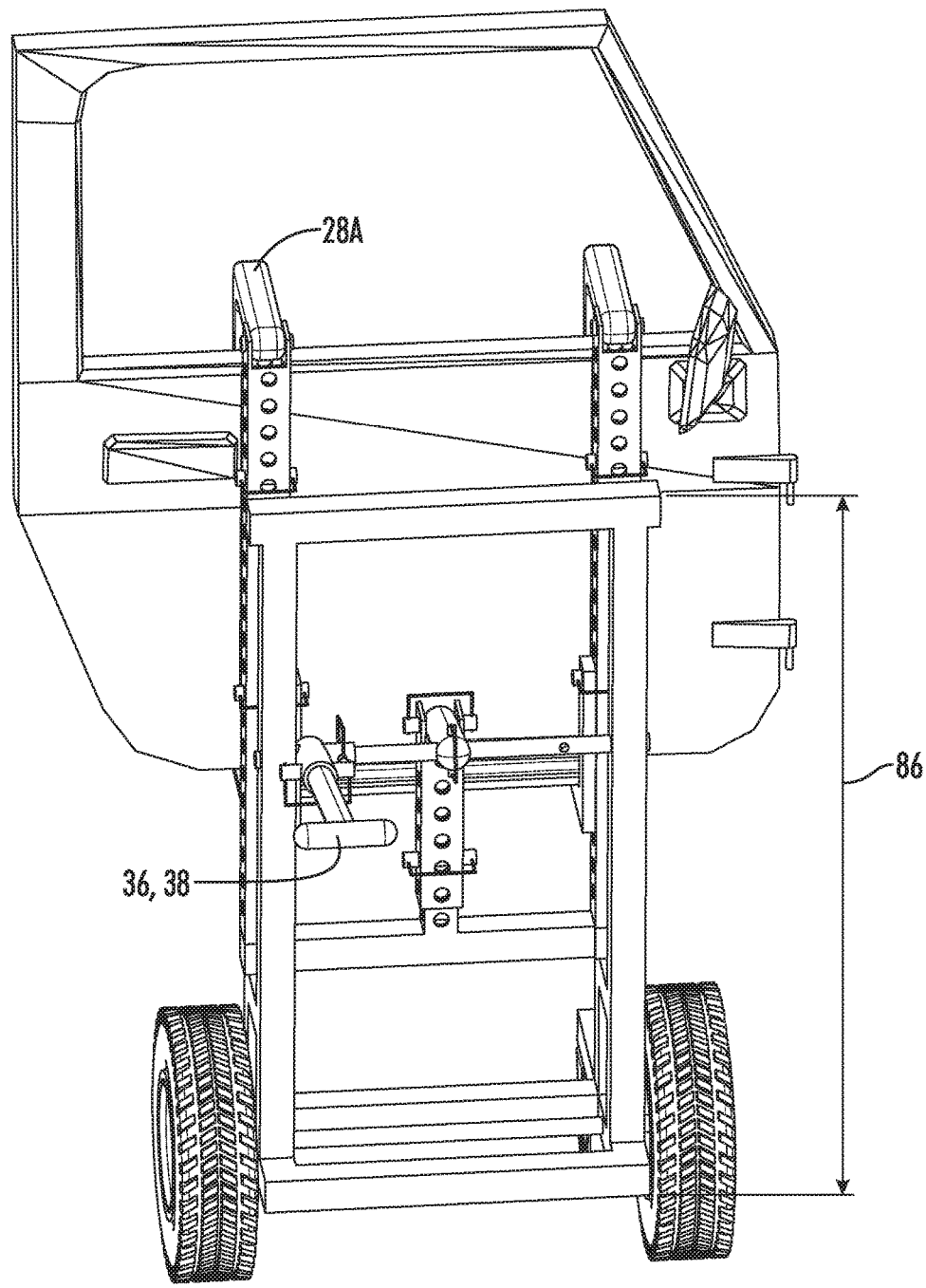
FIG. 6 illustrates a front perspective view of the vehicle door lift system of FIG. 1.
Figure 7:
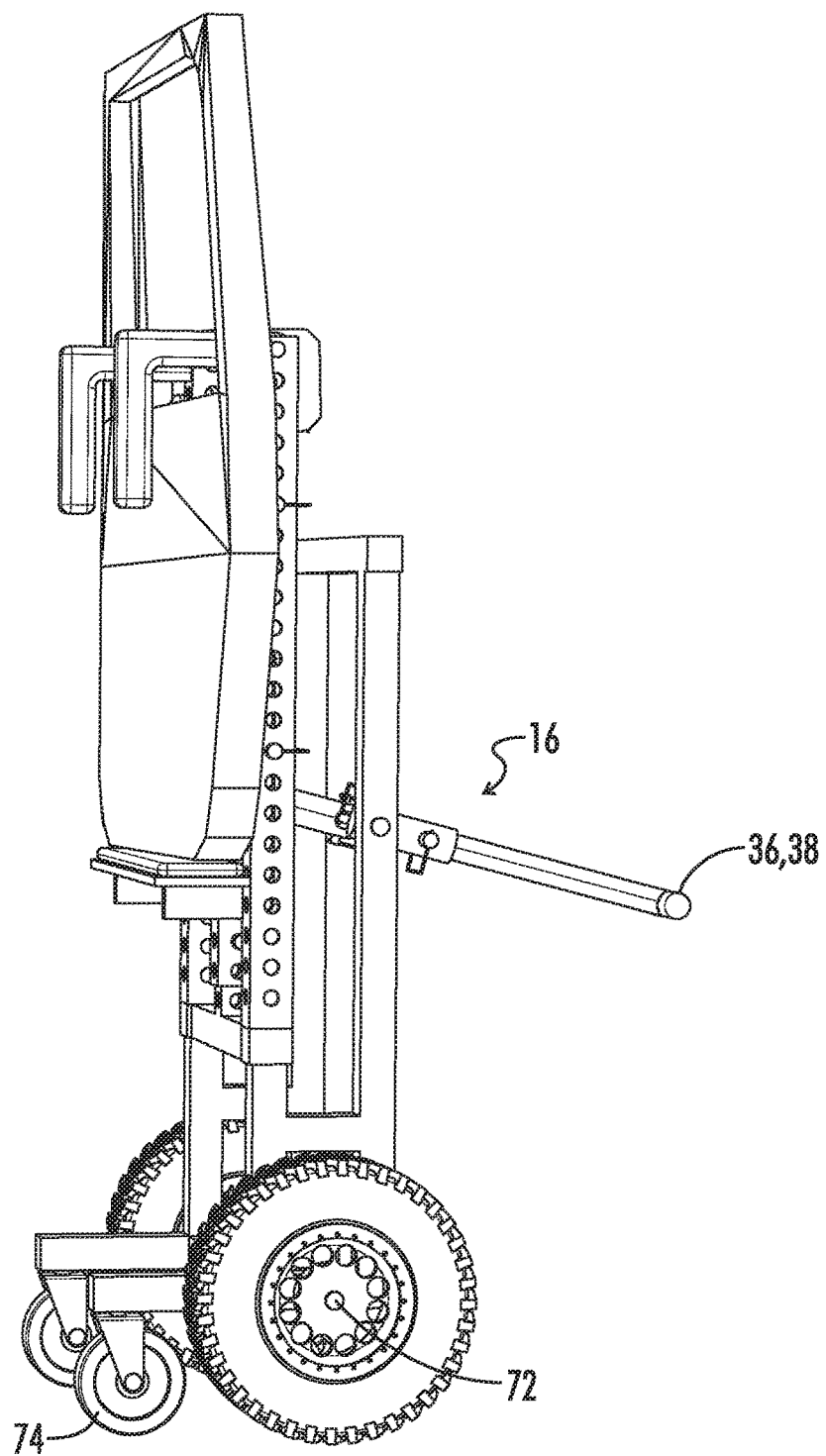
FIG. 7 illustrates a side perspective view of the vehicle door lift system of FIG. 1.
Figure 8:
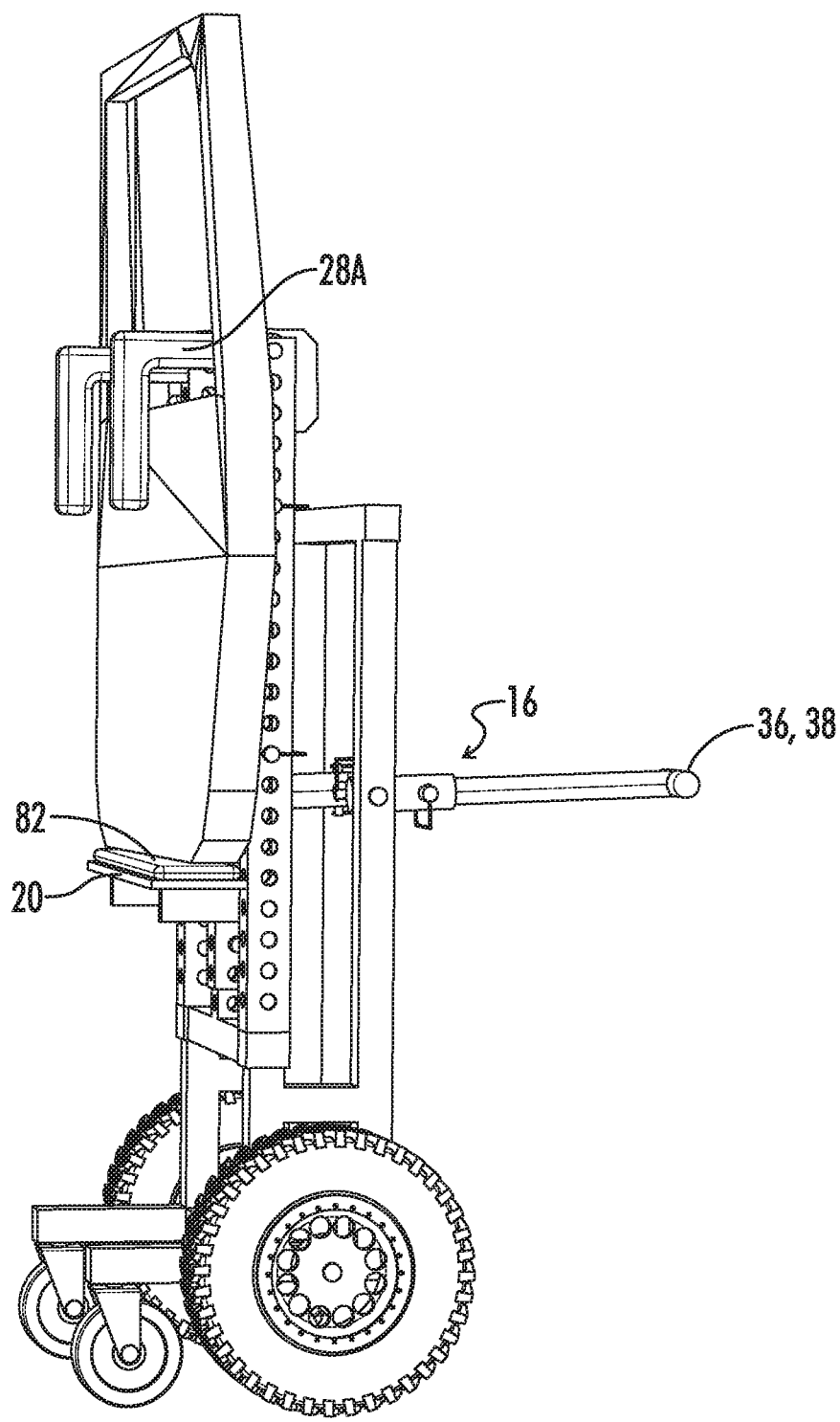
FIG. 8 illustrates a side perspective view of the vehicle door lift system of FIG. 1.
Figure 9:
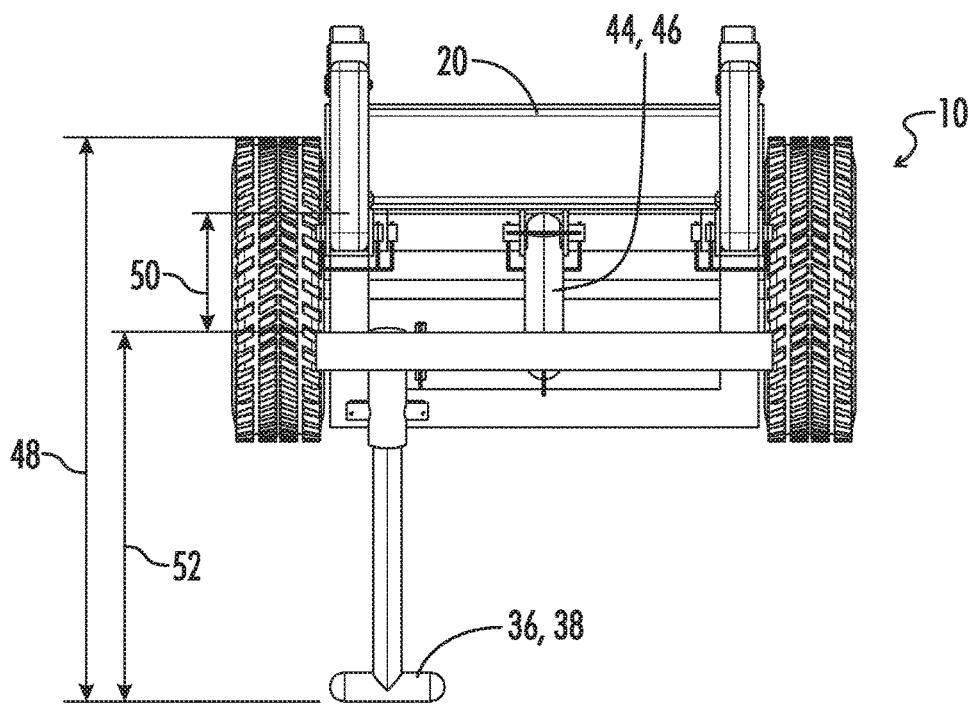
FIG. 9 illustrates a top plan view of the vehicle door lift system of FIG. 1.
Figure 10:
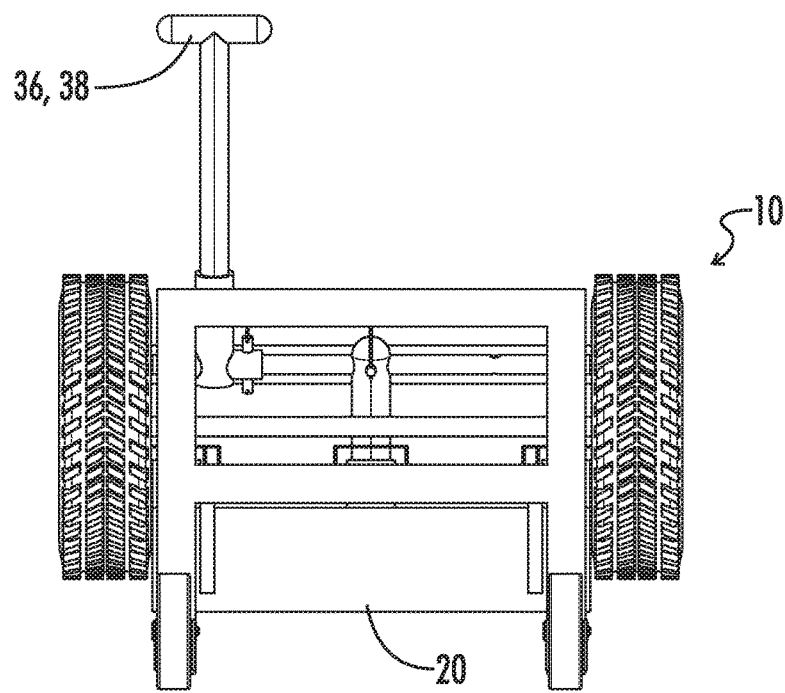
FIG. 10 illustrates a bottom plan view of the vehicle door lift system of FIG. 1.
Figure 11:
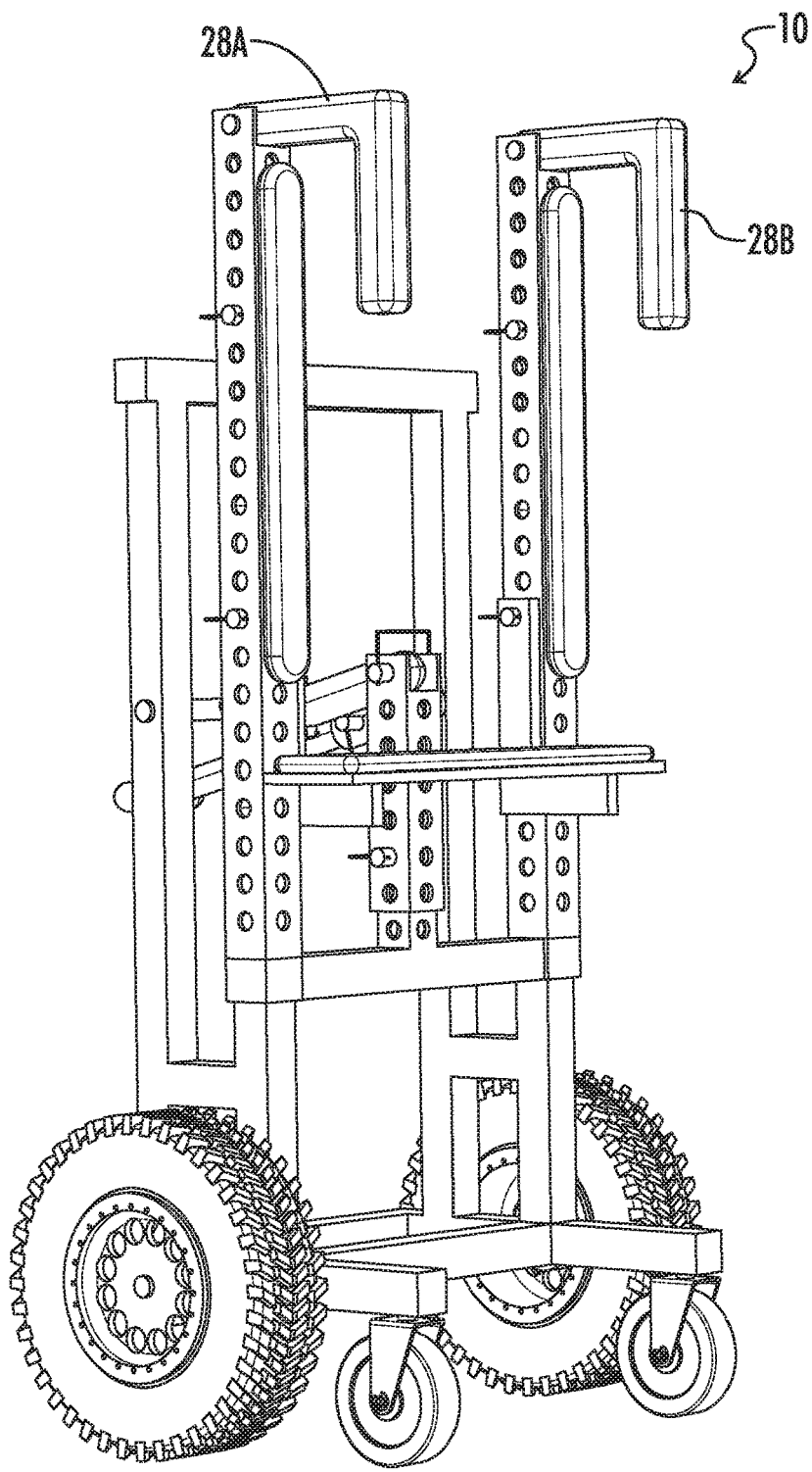
FIG. 11 illustrates a rear perspective view of the vehicle door lift system of FIG. 1.

Optionally, the at least one moveable hook 28A and 28B is configured to rotate between about 90 degrees and about 180 degrees about a hook pin 68 from the storage position to the door grasp position, as seen by comparing FIG. 3 (door engaged) with FIG. 4 (door captured).

Optionally, the at least one moveable vertical post 18A, 18B, and 18C and moveable bottom platform 20 comprises padding 70, e.g. foam padding, to prevent scratching of the vehicle. The fixed stand 34 may be located behind the moveable frame 84 as shown in the illustrated embodiments—i.e., the fixed stand 34 may be located between the user and the moveable frame 84.

Optionally, the system 10 comprises several pins 76 (e.g., cotter pins) as well as pin holes in the components (e.g., the vertical posts 18A, 18B and 18C) in order to allow the resting empty position's height of the moveable bottom platform 20 relative to the ground, base 12 and/or at least one hook 28A and 28B to be adjustable for various models of vehicles.

PART LIST

Vehicle Door lift system 10
Base 12
Wheel 14
Lever 16
Moveable Vertical Post 18A, 18B, & 18C
Moveable Bottom Platform 20
Vehicle Door window frame 24
Vehicle Door window opening 26
Moveable Hook 28A&B
Fixed Vertical Post 30A&B
Fixed Stand 34
Lever rear portion 36
Handle Bar 38
Lever middle portion 40
Middle Bar 42
Lever forward portion 44
Lifter Bar 46
Lever length 48
lifter bar length 50
Handle bar length 52
female cup 54
female cup aperture 56
middle bar first aperture 58
first side of the stand 60A
removable pin 62
middle bar second aperture 64 second side of the stand 60B
hook pin 68
padding 70
common axle 72
caster wheel 74
cotter pin 76
vehicle 78
vehicle door 80
vehicle door bottom 82
moveable frame 84
stand height 86
second female cup 88
Lower horizontal bar 90
Chain 92

Having now described the invention in accordance with the requirements of the patent statutes, those skilled in the art will understand how to make changes and modifications to the disclosed embodiments to meet their specific requirements or conditions. Changes and modifications may be made without departing from the scope and spirit of the invention. In addition, the steps of any method described herein may be performed in any suitable order and steps may be performed simultaneously if needed.

Terms of degree such as "generally", "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies. In addition, the steps of the methods described herein can be performed in any suitable order, including simultaneously. It is understood that use of the singular embraces the plural and vice versa

What is claimed is:

1. A vehicle door lift system comprising:
   a) a base comprising at least one wheel configured to move along the ground;
   b) a fixed frame comprising a plurality of fixed vertical posts that extend vertically upwardly from the base and have heights generally perpendicular to the ground;
   c) a moveable frame attached to, and vertically moveable relative to, the fixed frame and comprising:
      i) a lower horizontal bar extending generally parallel to the ground and generally perpendicular to the fixed vertical post heights;
      ii) a pair of moveable vertical posts, each moveable vertical post having a bottom end extending generally vertically upwardly from the lower horizontal bar, a top end, and a height extending from the bottom end to the top end and generally parallel to the fixed vertical post heights;
      iii) a moveable bottom platform attached to the moveable vertical posts, extending generally perpendicular relative to the moveable vertical post heights and configured to be placed under and support a bottom of a vehicle door comprising a vehicle door window frame defining a window opening; and
      iv) a pair moveable hooks, each moveable hook located above the moveable bottom platform and attached to a moveable vertical post and configured to rotate relative to the moveable vertical post from a storage position to a door grasp position in which the moveable hook wraps around a portion of the vehicle door window frame; and
   d) a lever configured to be moved by a human user, the lever comprising a rear portion comprising a handle bar, a middle portion comprising a middle bar connected to the rear portion and to the fixed frame, the middle bar extending generally parallel to the ground, generally perpendicular to the moveable vertical post heights, generally perpendicular to the handle bar and generally parallel to the lower horizontal bar, and a forward portion comprising a lifter bar having a rear portion connected to the middle bar and a forward portion connected to the lower horizontal bar, the lifter bar extending generally perpendicular to the middle bar, wherein movement of the handle bar toward the ground is configured to cause the middle bar to pivot about a pivot axis generally parallel to the ground, thereby raising the lifter bar forward portion upwardly relative to the fixed vertical posts so that the lower horizontal bar moves vertically upwardly relative to the fixed vertical posts, the moveable bottom platform moves vertically upwardly relative to the fixed vertical posts, the pair of moveable vertical posts slide vertically upwardly along at least some of the fixed vertical posts, and the pair of moveable hooks move vertically upwardly relative to the fixed vertical posts.

2. The vehicle door lift system of claim 1, wherein the pair of moveable vertical posts each comprise an interior and further wherein at least some of the fixed vertical posts are nested in the interiors of the pair of moveable vertical posts.

3. The vehicle door lift system of claim 1, wherein the plurality of fixed vertical posts each comprise an interior and further wherein the pair of moveable vertical posts are nested in the interiors of at least some of the fixed vertical posts.

4. The vehicle door lift system of claim 1 wherein each moveable hook is attached to a moveable vertical post by a hook pin extending generally perpendicular to the moveable vertical post heights.

5. The vehicle door lift system of claim 1 wherein the lever comprises a length extending from the forward portion to the rear portion, wherein the handle bar comprises a length generally parallel to the lever length, wherein the lifter bar comprises a length generally parallel to the lever length, and further wherein the length of the lifter bar is less than the handle bar length.

6. The vehicle door lift system of claim 1 wherein the handle bar is partially nested in an interior of a female cup, wherein the middle bar comprises a middle bar first aperture adjacent to a first side of the fixed frame and the female cup comprises a female cup aperture aligned with the middle bar first aperture, wherein the system comprises a removable pin extending through the middle bar first aperture and the female cup aperture and connecting the female cup to the middle bar, wherein the middle bar comprises a second aperture adjacent to a second side of the fixed frame and further wherein the female cup aperture is configured to be moved so that it aligns with the second aperture and a removable pin may be placed through the second aperture and the female cup aperture and so that the female cup aperture is adjacent to the second side of the fixed frame.

7. The vehicle door lift system of claim 1, wherein each moveable hook is configured to rotate between about 90 and about 180 degrees about a hook pin from the storage position to the door grasp position.

8. The vehicle door lift system of claim 1 wherein the moveable vertical posts comprise padding.

9. The vehicle door lift system of claim 1 wherein the base comprises at least two wheels sharing a common axle.

10. The vehicle door lift system of claim 1 wherein the base comprises at least one caster wheel.

11. The vehicle door lift system of claim 1 wherein each moveable hook is attached to the top end of a moveable vertical post.

12. The vehicle door lift system of claim 1 further comprising a chain located between the pair of moveable vertical posts and connecting the lifter bar to the lower horizontal bar.

13. The vehicle door lift system of claim 1 further comprising a third moveable vertical post located between the pair of moveable vertical posts and connecting the lifter bar to the lower horizontal bar.

14. A method of using a vehicle door lift system comprising the steps of:
 a) providing the vehicle door lift system of claim 1;
 b) placing the at least one moveable bottom platform under a vehicle door attached to a vehicle;
 c) moving the handle bar downwardly so as to pivot the middle bar about the middle bar pivot axis, thereby moving the lifter bar forward portion upwardly, thereby moving the lower horizontal bar, the moveable bottom platform, the pair of moveable hooks, and the moveable vertical posts vertically upwardly relative to the fixed vertical posts so as to move the vehicle door vertically upwardly relative to the fixed vertical posts; and
 d) disengaging the vehicle door from the vehicle.

15. The method of claim 14 wherein the method further comprises before step c, moving the moveable hooks from the storage position to the door grasp position.

* * * * *